(12) United States Patent
Louro (10) Patent No.: US 10,398,132 B2
(45) Date of Patent: Sep. 3, 2019

(54) APPARATUS FOR COUPLING A PET LEASH AND PET COLLAR

(71) Applicant: Ronald Louro, Warren, RI (US)

(72) Inventor: Ronald Louro, Warren, RI (US)

( * ) Notice: Subject to any disclaimer, the term of this patent is extended or adjusted under 35 U.S.C. 154(b) by 379 days.

(21) Appl. No.: 15/424,772

(22) Filed: Feb. 3, 2017

(65) Prior Publication Data

US 2017/0142936 A1   May 25, 2017

Related U.S. Application Data

(63) Continuation-in-part of application No. 13/152,029, filed on Jun. 2, 2011, now abandoned.

(51) Int. Cl.
| | | |
|---|---|---|
| *A01K 27/00* | (2006.01) | |
| *A44B 11/26* | (2006.01) | |
| *A44B 13/02* | (2006.01) | |

(52) U.S. Cl.
CPC .......... *A01K 27/005* (2013.01); *A01K 27/002* (2013.01); *A01K 27/003* (2013.01); *A44B 11/26* (2013.01); *A44B 13/02* (2013.01)

(58) Field of Classification Search
CPC .. A01K 27/005; A01K 27/002; A01K 27/003; A44B 11/26; A44B 13/02
See application file for complete search history.

(56) References Cited

U.S. PATENT DOCUMENTS

| | | | | |
|---|---|---|---|---|
| 4,010,879 A * | 3/1977 | George | ................ | A47G 25/483 |
| | | | | 223/96 |
| 7,174,857 B2 * | 2/2007 | Lord | .................... | A01K 27/001 |
| | | | | 119/794 |
| 7,174,859 B2 * | 2/2007 | Lee | ....................... | A01K 27/001 |
| | | | | 119/772 |
| 7,322,146 B1 * | 1/2008 | Baldwin | ................ | A01K 77/00 |
| | | | | 24/16 PB |
| 2005/0115519 A1 * | 6/2005 | Atkins | ................ | B63B 35/7993 |
| | | | | 119/792 |
| 2006/0236956 A1 * | 10/2006 | Lord | .................... | A01K 27/001 |
| | | | | 119/794 |
| 2011/0203532 A1 * | 8/2011 | Edlin | ................... | A01K 27/005 |
| | | | | 119/792 |
| 2012/0067299 A1 * | 3/2012 | Vollmecke | .......... | A01K 27/001 |
| | | | | 119/863 |
| 2016/0050890 A1 * | 2/2016 | Fitzgerald | ........... | A01K 29/005 |
| | | | | 119/795 |
| 2016/0286764 A1 * | 10/2016 | Clark | ................... | A01K 27/005 |

FOREIGN PATENT DOCUMENTS

| | | | | |
|---|---|---|---|---|
| JP | 2000262178 A | * | 9/2000 | |
| JP | 2005204622 A | * | 8/2005 | |
| JP | 2008061606 A | * | 3/2008 | |

* cited by examiner

*Primary Examiner* — Son T Nguyen (74) *Attorney, Agent, or Firm* — Daniel N. Smith (57) ABSTRACT

An apparatus that couples an animal leash and animal collar to form a harness assembly. The apparatus is placed on the back of an animal and contains two separate channels configured to hold and maintain a flat leash in a loop encircling the animal's torso. The elongate and narrow shape of the channels prevents the contained leash from turning or becoming tangled in the around the animal. The apparatus is detachable into two separate components to allow the loop to be removable from the animal. The apparatus also contains a snap bolt connecter for attaching the collar.

20 Claims, 12 Drawing Sheets

APPARATUS FOR COUPLING A PET LEASH AND PET COLLAR

CROSS REFERENCE TO RELATED APPLICATION

This application claims priority to and is a continuation-in-part of U.S. patent application Ser. No. 13/152,029, entitled "Apparatus for Coupling a Pet Leash and a Pet Collar" filed Jun. 2, 2011, the contents of which are incorporated herein by reference in their entirety.

FIELD OF THE INVENTION

The field of the invention relates to an apparatus for easily attaching and maintaining a standard flat leash around the torso of an animal in a loop. The apparatus also contains a bolt snap or other connector for attaching the looped leash to the animal collar. The apparatus is allows the looped leash to be easily detachable from the animal by unlocking into two separate portions.

BACKGROUND OF INVENTION

Domesticated household animals, such as dogs, cats or other pets, are restrained and controlled by a leash held by a user. However, since conventional leashes are only connected to a neck collar, these connections may not provide enough control over the animal. The collar may be loosely fitted around the animal, the animal may be more aggressive in nature, or act more aggressive when exposed to various stimuli, such as other nearby animals or loud noises. Furthermore, conventional leashes and collars may choke or otherwise apply undesirable forces to a neck of the animal.

Various harnesses have been developed that can be attached over an animal. These body harnesses provide an owner with greater control when attached to a leash since the harness is often connected around the neck and torso of the animal.

However, such harnesses can be cumbersome to attach to animals, especially animals that are prone to a lot of movement.

The subject invention solves the problem of the prior art by providing a device that can be used with existing strap leashes and collars to easily form and maintain a stable animal harness. This invention allows an owner to easily attach and remove this harness assembly to an animal with a few simple movements.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses an animal restraining apparatus comprising: a housing comprising a central axis defined by a first side and a second side, wherein the housing further comprises a first elongated, substantially flat channel traversing the housing, further wherein the housing comprises a latch opening; a clip removable received within the latch opening of the housing, wherein the clip comprises a second elongated, substantially flat channel traversing the clip; a user-actuated mechanism on the housing that locks the clip within the latch opening of the housing, wherein actuation of the mechanism unlocks the clip from the housing; a bolt snap extending along a first axis from a proximal end attached to the housing to a distal end, wherein the first axis is substantially perpendicular to the central axis of the housing; an elongated, substantially flat leash, with a proximal handle end, and a distal end, wherein the distal end of the leash is looped through the second channel of the clip and is attached to itself, further wherein between the proximal end and the distal end, the leash traverses the first channel of the housing in a substantially flat orientation; wherein the apparatus is configured to mount on a back of an animal such that the distal end of the bolt snap is proximate to a neck of the animal, wherein the apparatus is configured to hold the animal leash wrapped onto an abdomen of the animal with the proximal end free and the distal end looped through the second channel of the clip such that the leash defines a loop encircling a torso of the animal, wherein the distal end of the bolt snap is removably attached to an animal collar of the animal; and wherein the apparatus is removed from the animal by actuating the user-actuated mechanism on the housing to unlock the clip, thereby breaking the loop encircling the torso of the animal.

The subject invention further discloses an animal restraining apparatus comprising: a housing comprising a central axis defined by a first side and a second side, wherein the housing further comprises a first elongated, substantially flat channel traversing the housing, further wherein the housing comprises a latch opening; a clip removable received within the latch opening of the housing, wherein the clip comprises a second elongated, substantially flat channel traversing the clip; a user-actuated mechanism on the housing that locks the clip within the latch opening of the housing, wherein actuation of the mechanism unlocks the clip from the housing; a bolt snap extending along a first axis from a proximal end attached to the housing to a distal end, wherein the first axis is substantially perpendicular to the central axis of the housing; an elongated, substantially flat leash, with a proximal handle end, and a distal end, wherein the distal end of the leash is looped through the second channel of the clip and is attached to itself, further wherein between the proximal end and the distal end, the leash traverses the first channel of the housing in a substantially flat orientation; wherein, when the clip is locked within the latched opening of the housing, the apparatus holds the leash in a loop between the portion of the leash that traverses the first channel of the housing and the distal end of the leash looped through the second channel of the clip, such that the first axis of the bolt snap is substantially perpendicular to the loop of the leash, and the proximal end of the leash is free, further wherein actuating the user-actuated mechanism on the housing to unlock the clip breaks the leash loop.

In further embodiments of the subject invention, the housing is substantially cylindrical in shape.

In other embodiments of the subject invention, the leash is a wide flat leash.

In additional embodiments of the subject invention, the leash is a composed of non-metallic materials.

In other embodiments of the subject invention, the user actuated release mechanism comprises a spring-action latch release button.

In further embodiments of the subject invention, the first channel and the second channel are each configured to hold the leash such that the leash cannot turn in the apparatus.

In embodiments of the subject invention, the first channel and the second channel are each configured to slidably receive the animal leash such that a wide flat surface of the animal leash remains substantially aligned with the central axis as it is inserted.

In other embodiments of the subject invention, the first side and the second side of the housing are substantially flat.

In additional embodiments of the subject invention, the first side and the second side of the housing are substantially coplanar.

In embodiments of the subject invention, the first side and the second side of the housing are substantially perpendicular to the central axis.

The subject invention also discloses an animal restraining apparatus for removably coupling an animal leash and an animal collar; the apparatus comprising: a housing comprising a central axis defined by a first portion removably attached to a second portion, and further defined by a first side and a second side, wherein the first side and the second side are separated by a boundary component; a first connector extending along a first axis from a proximal end attached to the housing to a distal end, wherein the first axis is substantially perpendicular to the central axis; wherein the apparatus is mounted on the back of the animal such that the distal end of the first connector is proximate to the neck of the animal, further wherein a distal end of the leash is inserted through a first channel traversing the first portion of the housing, wrapped onto the abdomen of the animal, inserted through a second channel traversing the second portion of the housing, and re-attached to a non-distal end portion of the animal leash to define a loop encircling the torso of the animal, wherein the distal end of the first connector removably attaches to a second connector mounted on the animal collar; and a user-actuated release mechanism on the housing that separates the first portion of the housing from the second portion of the housing for removing the looped leash from the animal.

In further embodiments of the subject invention, the housing may have a shape that is substantially cylindrical, spherical, cube, cuboid, hexagonal prism, or octagonal prism.

In another embodiment of the subject invention, the housing may have a cross-sectional shape traverse to the central axis that is selected from the group consisting of substantially circular, elliptical, square, triangular, hexagonal or octagonal.

In an additional embodiment of the subject invention, the first connection may be a bolt snap.

In another embodiment of the subject invention, the second connector on collar may be a ring secured thereto.

In a further embodiment of the subject invention, the leash may be a wide flat leash.

In an additional embodiment of the subject invention, the leash may be a strap lease.

In another embodiment of the subject invention, the leash may be composed of non-metallic materials.

In a further embodiment of the subject invention, the user actuated release mechanism may be a movable latch on the first portion configured to lock into a latching hole on the second portion.

In an additional embodiment of the subject invention, the latch may be a spring-action release button.

In a further embodiment of the subject invention, the first channel and the second channel may complementary shapes with each other.

In another embodiment of the subject invention, the first channel and the second channel may have non-complementary shapes.

In an additional embodiment of the subject invention, the first channel and the second channel may be substantially parallel with the boundary component of the housing.

In another embodiment of the subject invention, the first channel and the second channel may each be configured to hold the leash such that the leash cannot turn in the apparatus.

In a further embodiment of the subject invention, the first channel and the second channel may each be configured to slidably receive the animal leash such that a wide flat surface of the animal leash remains substantially aligned with the central axis as it is inserted.

In an additional embodiment of the subject invention, the first channel and the second channel may each have an elongated narrow shape.

In another embodiment of the subject invention, the boundary component may have an exterior surface that is substantially parallel with the central axis.

In a further embodiment of the subject invention, the first side and the second side of the housing may be substantially flat.

In an additional embodiment of the subject invention, the first side and the second side of the housing may be substantially coplanar.

In further embodiments of the subject invention, the first side and the second side of the housing may be substantially perpendicular to the central axis.

Another embodiment of the subject invention is a control device for use with small quadruped animals having a pair of forelegs that releasably couples an animal leash and an animal collar mounted around the neck of the animal; the apparatus comprising: a housing comprising a substantially flattened shape with a central axis, defined by a first portion removably attached to a second portion in a locked configuration, and further defined by a first side and a second side; a first channel traversing the first portion of the housing, wherein the first channel is configured to slidably receive the animal leash; a second channel traversing the second portion of the housing, wherein the second channel is configured to slidably receive the animal leash; a first connector extending along a first axis from a proximal end to a distal end, wherein the first connector is attached to housing at the proximal end and the first axis is substantially perpendicular to the central axis; wherein the apparatus is mounted on the back of the animal such that the distal end of the first connector is proximate to the neck of the animal, wherein the animal leash is inserted though the first channel, mounted underneath the animal behind the pair of forelegs, inserted through the second channel and re-attached to a non-distal end portion of the animal leash to define a loop encircling the torso of an animal, further wherein the distal end of the first connector removably couples to a second connector mounted on the animal collar; and a user-actuated mechanism on the housing that separates the first portion of the housing from the second portion of the housing in an unlocked configuration for removing the looped leash from the animal.

Another embodiment of the subject invention is an animal restraining harness assembly comprising: a collar mounted on the neck of the animal with a attached ring; a detachable coupling apparatus comprising a substantially disk shaped housing with a central axis, wherein the housing is defined by a first portion removably attached to a second portion, and the housing is further defined by a first side and a second side, wherein the first side and the second side are separated by a boundary component; a bolt snap attached at a proximal end to the housing and extending along a first axis that is substantially perpendicular to the central axis to a distal end, wherein the apparatus is placed on the back of the animal such that the distal end of the bolt snap is removably attached to the attached ring on the collar; a wide flat animal leash inserted through a first channel traversing the first portion of the housing, wherein the first channel is configured to receive the animal leash such that the wide flat surface of the animal leash remains substantially aligned with the central axis as it passes through the first channel, wherein the leash is wrapped underneath the body of the animal, further wherein the leash is inserted through a second channel traversing the second portion of the housing, wherein the second channel is configured to receive the animal leash such that the widest flat surface of the animal leash remains substantially aligned with the central axis as it passes through the second channel, and the leash is attached to a non-distal end portion to define a loop encircling the torso of the animal; and a user-actuated release mechanism on the housing that separates the first portion of the housing from the second portion of the housing for removing the looped leash from the animal.

Another embodiment of the subject invention is an animal restraining apparatus for removably coupling a wide flat animal leash and an animal collar to form an animal harness; the apparatus comprising: a housing comprising a substantially disk shape with a central axis, defined by a first portion removably attached to a second portion, and further defined by a substantially flat first side and a substantially flat second side, wherein the first side and the second side are substantially perpendicular to the central axis, and the housing is further defined by a substantially curved boundary component separating the first side and the second side; a first channel traversing the first portion of the housing from a first opening on the first side to a second opening on the second side, wherein the first channel is configured to receive the animal leash; a second channel traversing the second portion of the housing from a third opening on the first side to a fourth opening on the second side, wherein the second channel is configured to receive the animal leash; a bolt snap extending along a first axis from a proximal end to a distal end, wherein the bolt snap is attached to the housing at the proximal end and the first axis is substantially perpendicular to the central axis; wherein the apparatus is mounted on the back of the animal such that the distal end of the bolt snap is proximate to the neck of the animal, further wherein a distal end of the animal leash is inserted though the first channel, wrapped underneath the animal behind the forelegs, inserted through the second channel and re-attached to a non-distal end portion of the animal leash to form a loop encircling the torso of the animal; wherein the distal end of the bolt snap removably attaches to the animal collar to form the animal harness with the looped leash; and a user-actuated release mechanism on the housing that separates the first portion of the housing from the second portion of the housing for removing the looped leash from the animal.

Another embodiment of the subject invention is an animal restraining apparatus for removably coupling a wide flat animal leash and an animal collar to form an animal harness, the apparatus comprising: a housing comprising a substantially cylindrical shape with a cylindrical axis, defined by a first portion removably attached to a second portion, and further defined by a substantially flat first side and a substantially flat second side, wherein the first side and the second side are substantially coplanar and perpendicular to the cylindrical axis, and the housing is further defined by a substantially curved boundary component separating the first side and the second side, wherein the curved boundary component has an exterior surface that is substantially parallel with the cylindrical axis; a first channel traversing the first portion of the housing from a first opening on the first side to a second opening on the second side, wherein the first channel is substantially parallel with the curved boundary component, further wherein the first channel is configured to slidably receive the animal leash such that the wide flat surface of the animal leash remains substantially aligned with the cylindrical axis as it is inserted through the first channel; a second channel traversing the second portion of the housing from a third opening on the first side to a fourth opening on the second side, wherein the second channel is substantially parallel with the curved boundary component, further wherein the second channel is configured to slidably receive the animal leash such that the wide flat surface of the animal leash remains substantially aligned with the cylindrical axis as it is inserted through the second channel, wherein the first channel and the second channel comprises complementary shapes on the housing; a bolt snap extending along a first axis from a proximal end to a distal end, wherein the bolt snap is attached to the housing at the proximal end and the first axis is substantially perpendicular to the cylindrical axis; wherein the apparatus is placed on the back of the animal such that the distal end of the bolt snap is proximate to the neck of the animal, further wherein a distal end of the animal leash is inserted though the first channel, wrapped underneath the body of the animal, inserted through the second channel and re-attached to a non-distal end portion of the animal leash to form a loop encircling the animal, wherein the distal end of the bolt snap removably attaches to the animal collar to form the animal harness with the looped leash; and a user-actuated release mechanism on the housing that separates the first portion of the housing from the second portion of the housing for removing the looped animal leash from the animal.

There have thus been broadly outlined important features of the invention in order that the detailed description thereof that follows may be better understood, and in order that the present contribution to the art may be better appreciated. There are additional features of the invention that will be described hereinafter and which will form the subject matter of the claims appended hereto. These together with other embodiments of the invention, and with various features of novelty which characterize the invention, are pointed out with particularity in the claims annexed to and formed as part of this disclosure.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

In embodiments of the subject invention, the term "relatively" is defined as a comparison of a property, or the proportion of a property between two components.

For a conceptual understanding of the invention and its operational advantages, refer to the accompanying drawings and descriptive matter in which there are preferred embodiments of the invention illustrated. Other features and advantages of the present invention will become apparent from the following description of the preferred embodiment(s), taken in conjunction with the accompanying drawings, which by way of example; illustrate the principles of the invention.

BRIEF DESCRIPTION OF THE DRAWINGS

Advantages of the present invention will be apparent from the following detailed description of exemplary embodiments thereof, which description should be considered in conjunction with the accompanying drawings.

DETAILED DESCRIPTION OF EMBODIMENTS

The following will describe, in detail, several embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 1:
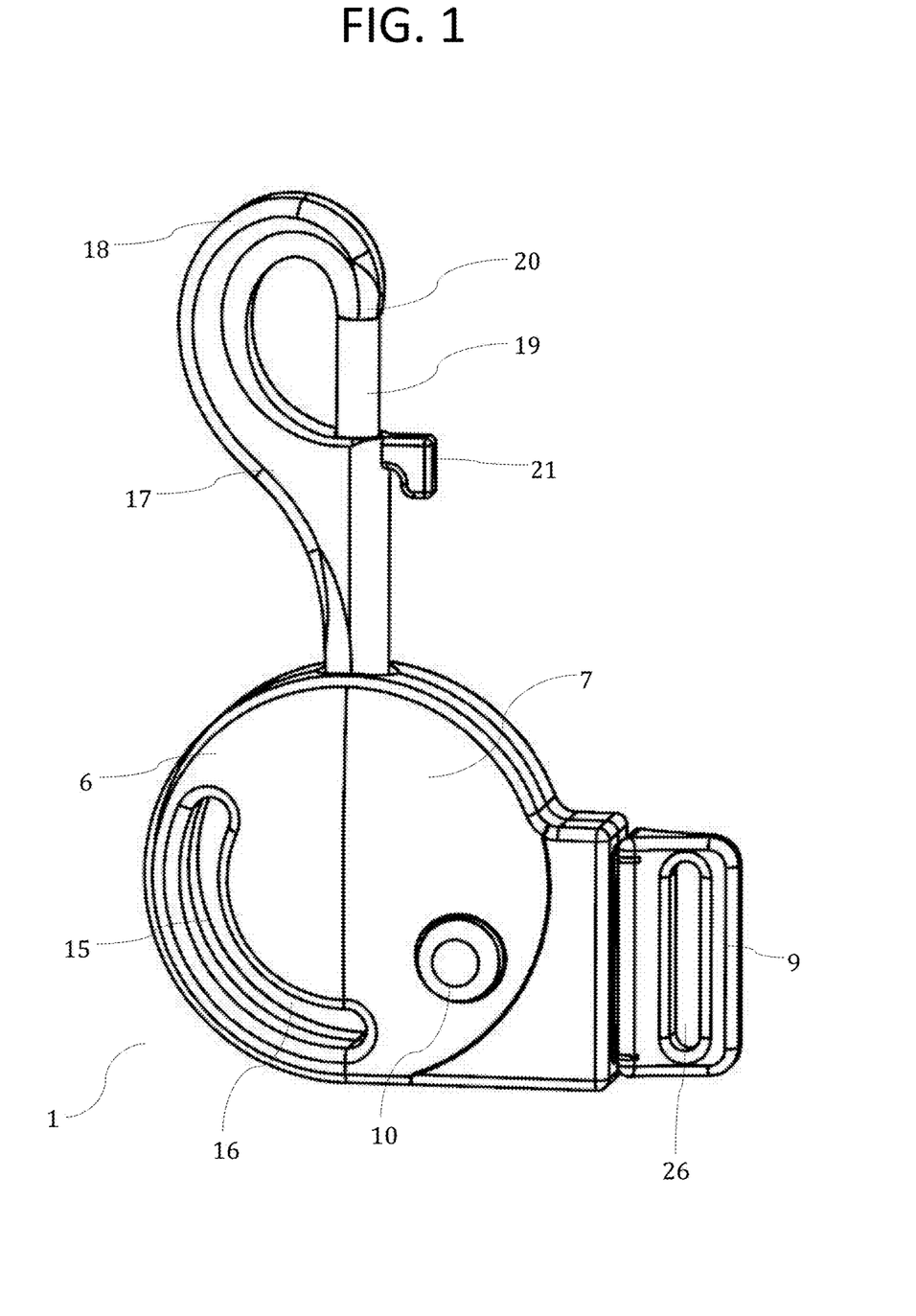
FIG. 1 is a right perspective view of an apparatus for coupling a pet leash and a pet collar in the closed position.
Figure 2:
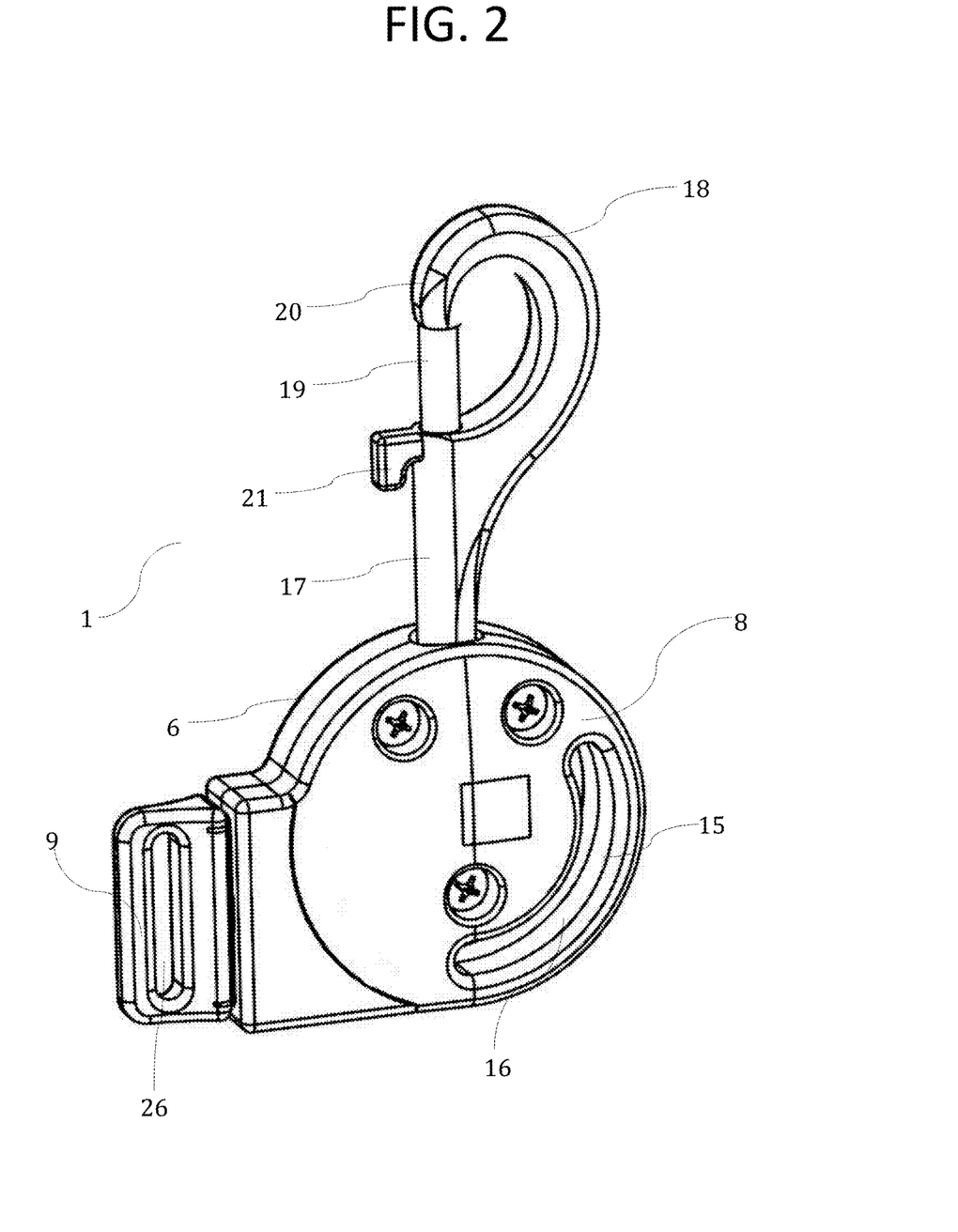
FIG. 2 is a left perspective view of the apparatus.
Figure 3:
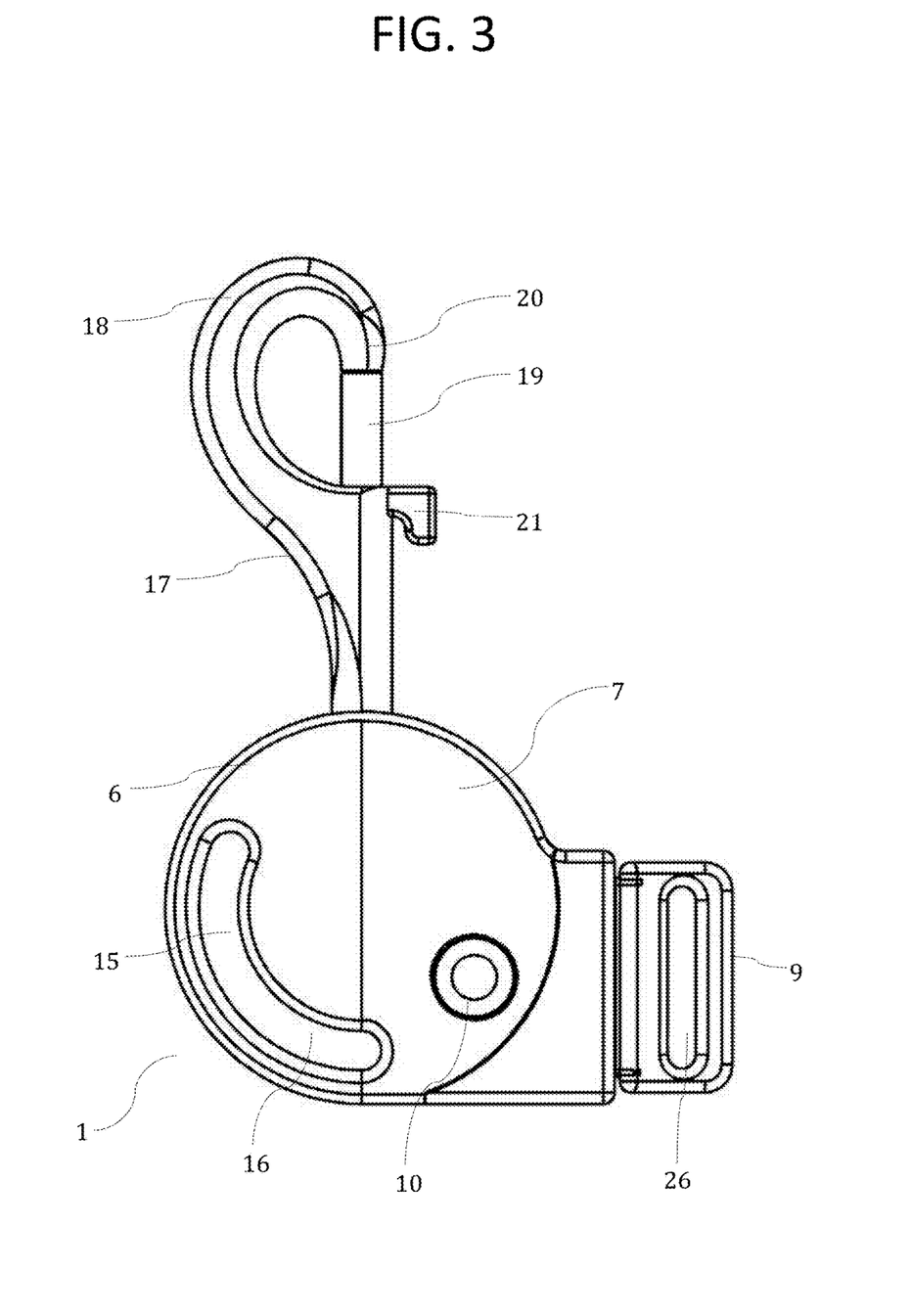
FIG. 3 is a right side view of the apparatus.
Figure 4:
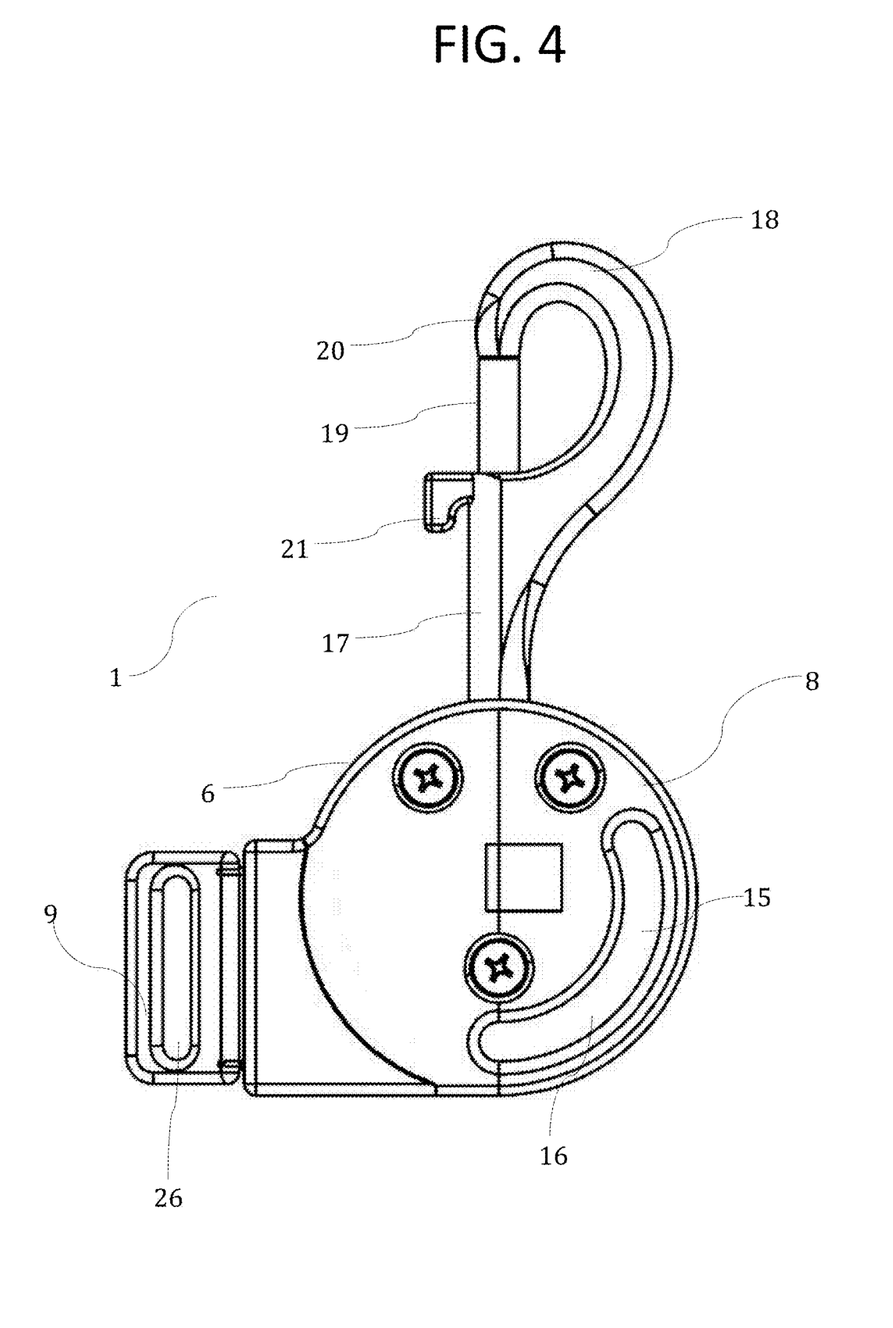
FIG. 4 is a left side view of the apparatus.
Figure 5:
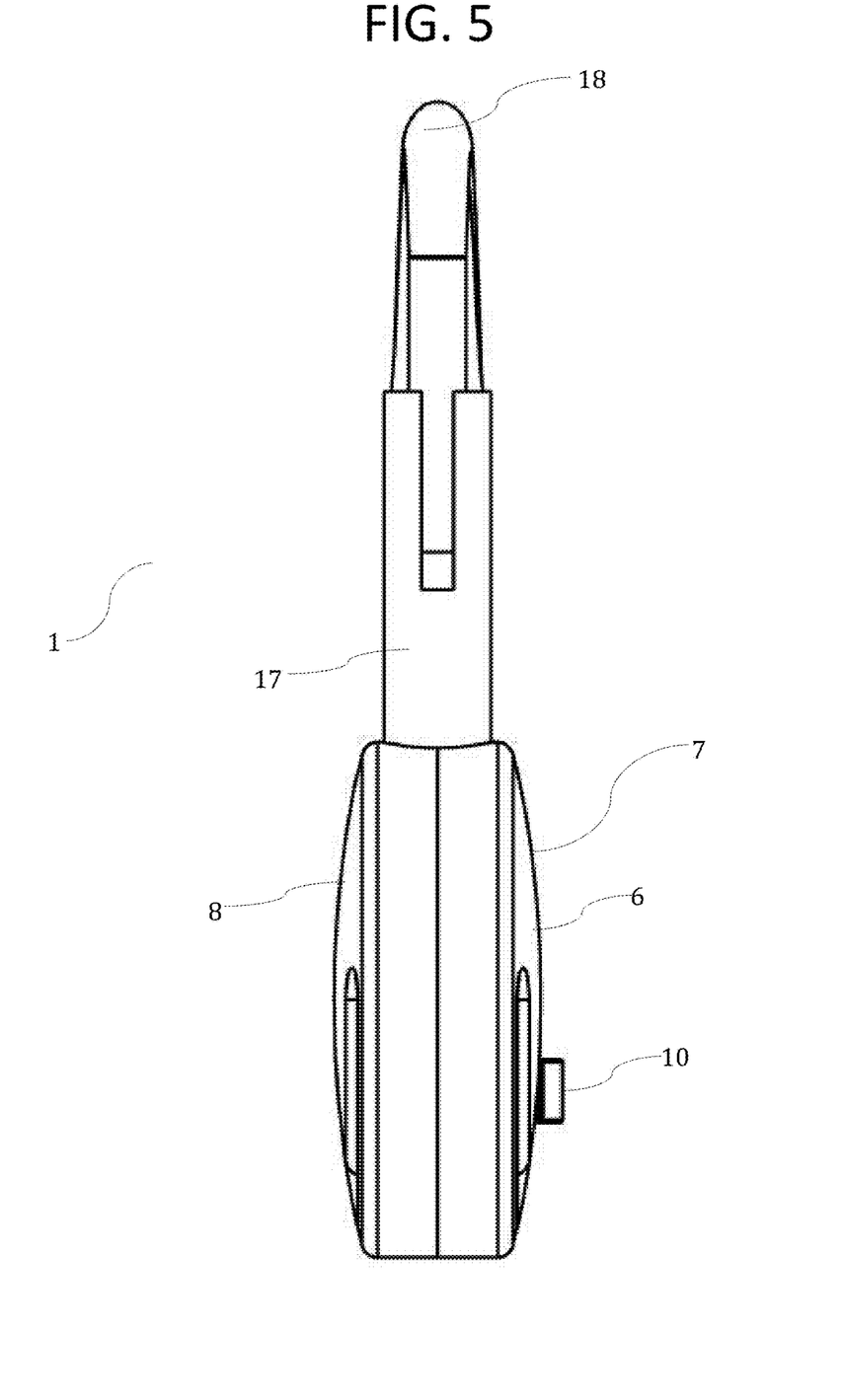
FIG. 5 is a rear view of the apparatus.
Figure 6:
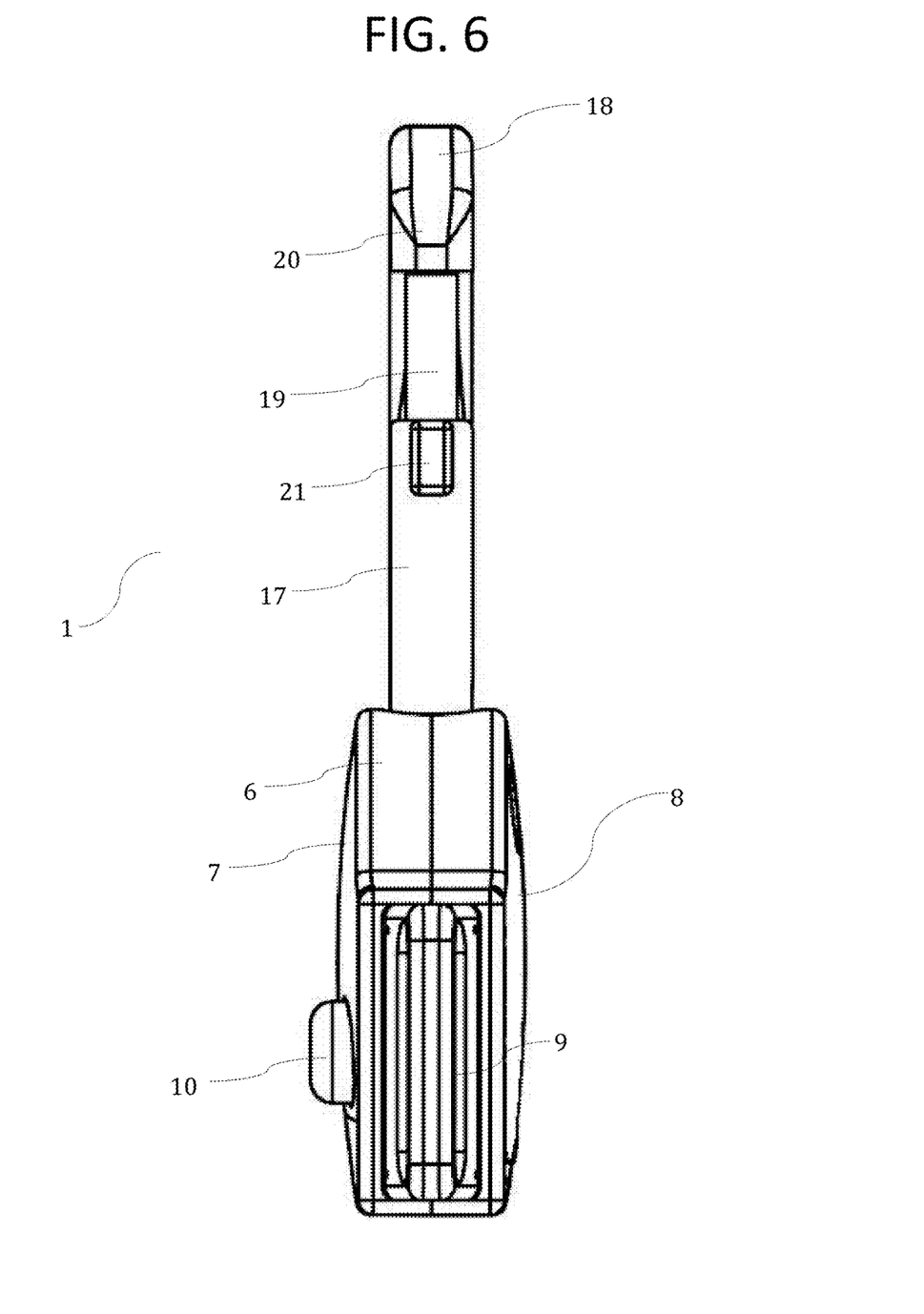
FIG. 6 is a front view of the apparatus.
Figure 7:
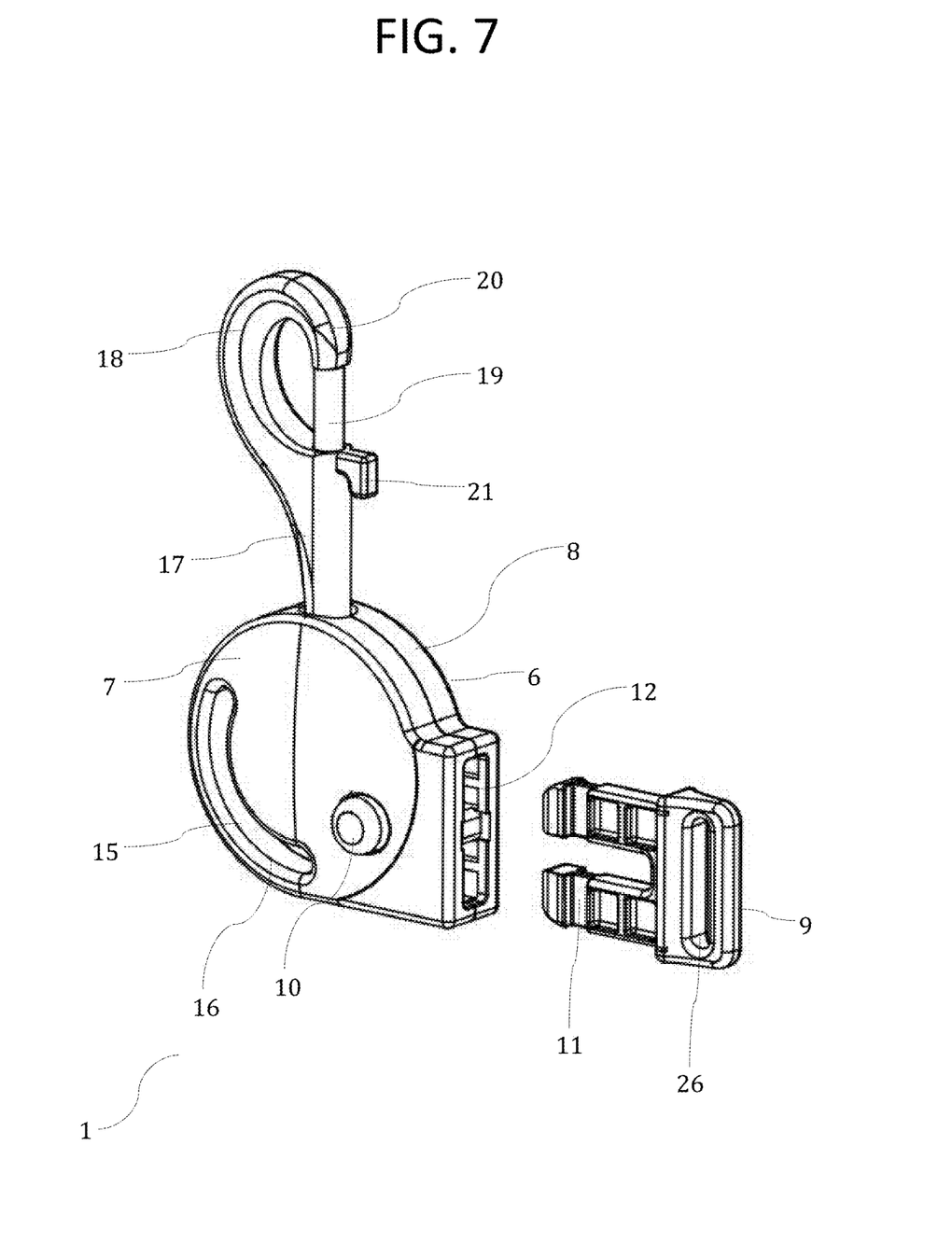
FIG. 7 is a right perspective view of the apparatus for coupling a pet leash and a pet collar in the open position.
Figure 8:
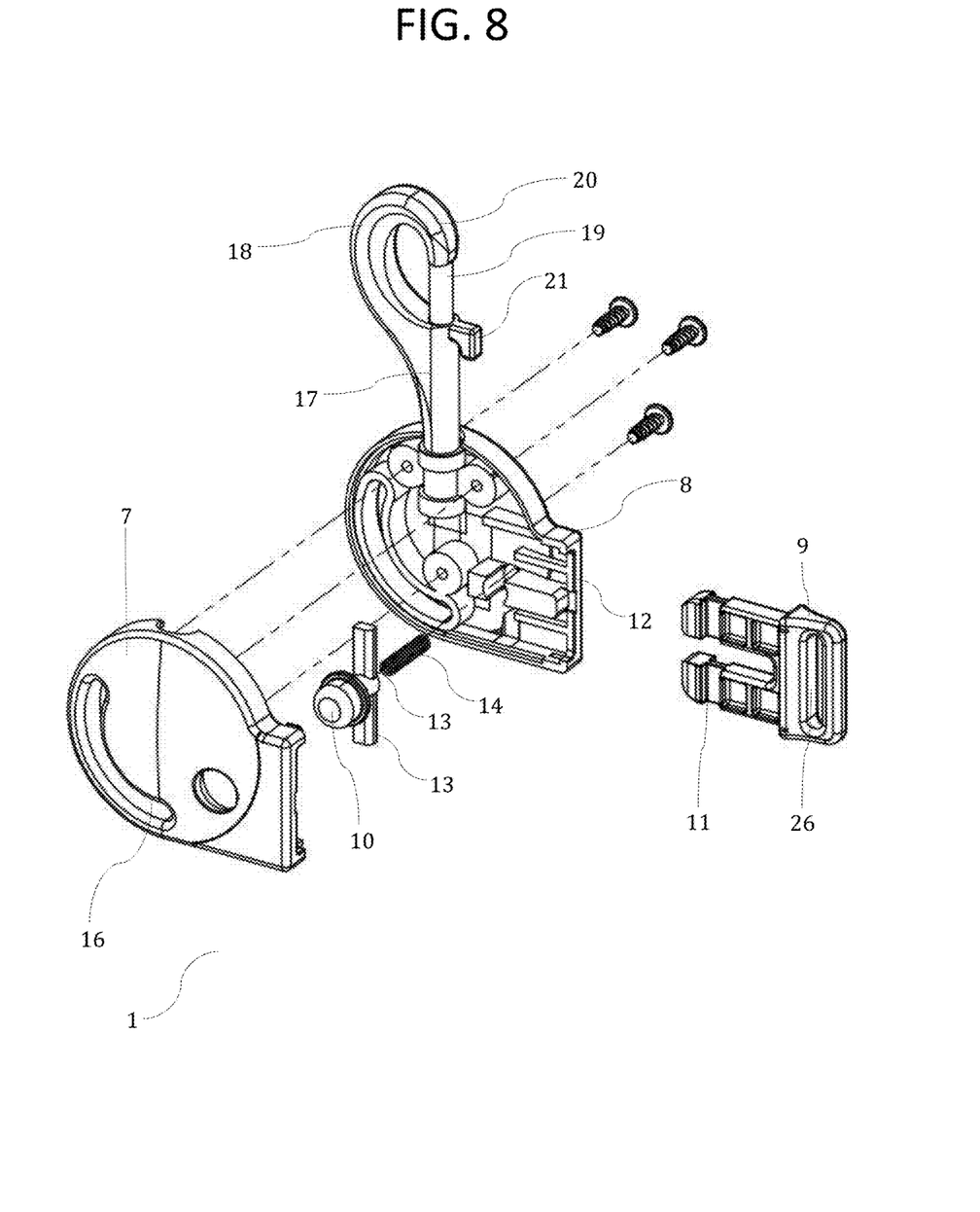
FIG. 8 is an exploded view of the apparatus.
Figure 9:
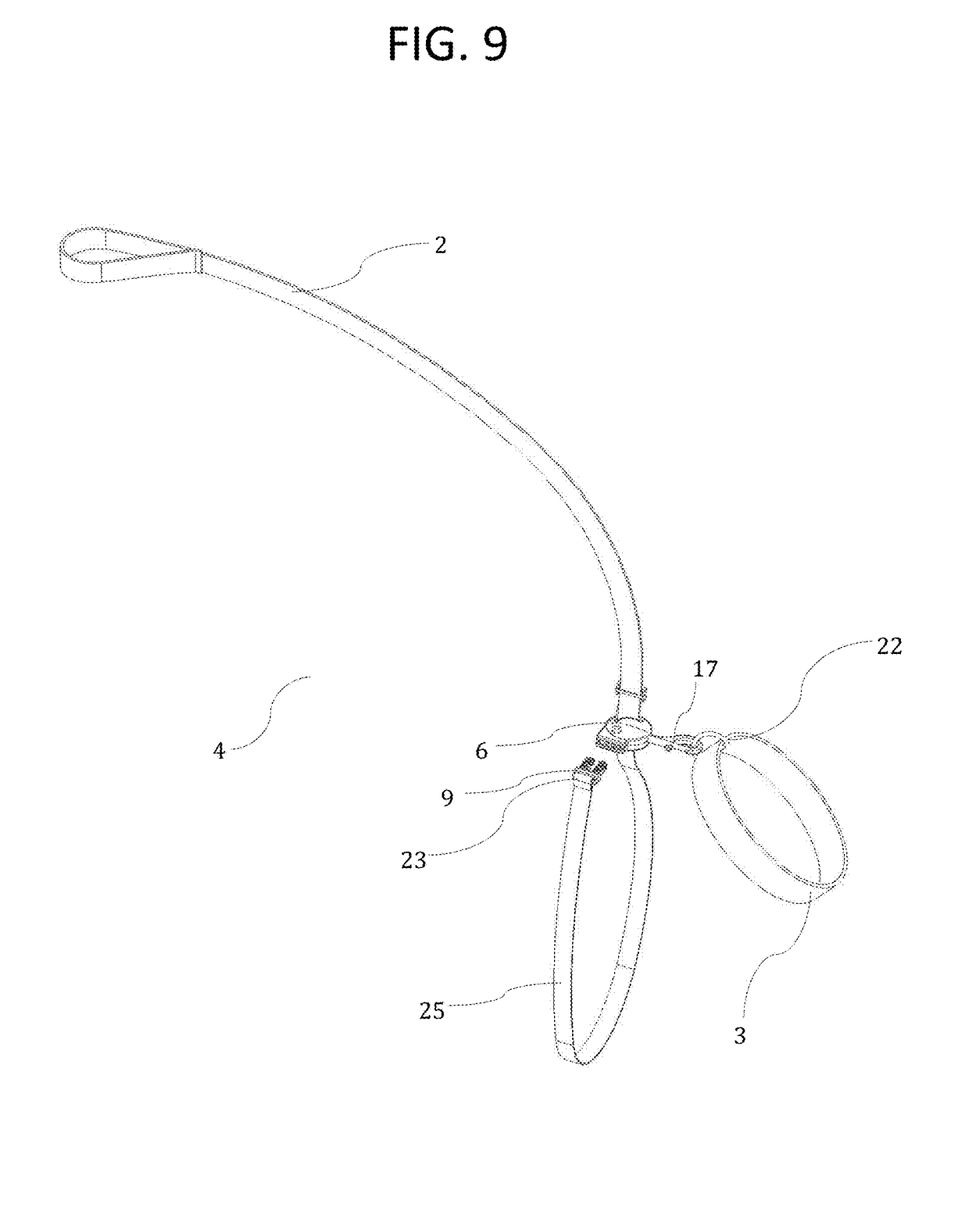
FIG. 9 is a top perspective view of the apparatus attached to a pet leash and a pet collar in the open position.
Figure 10:
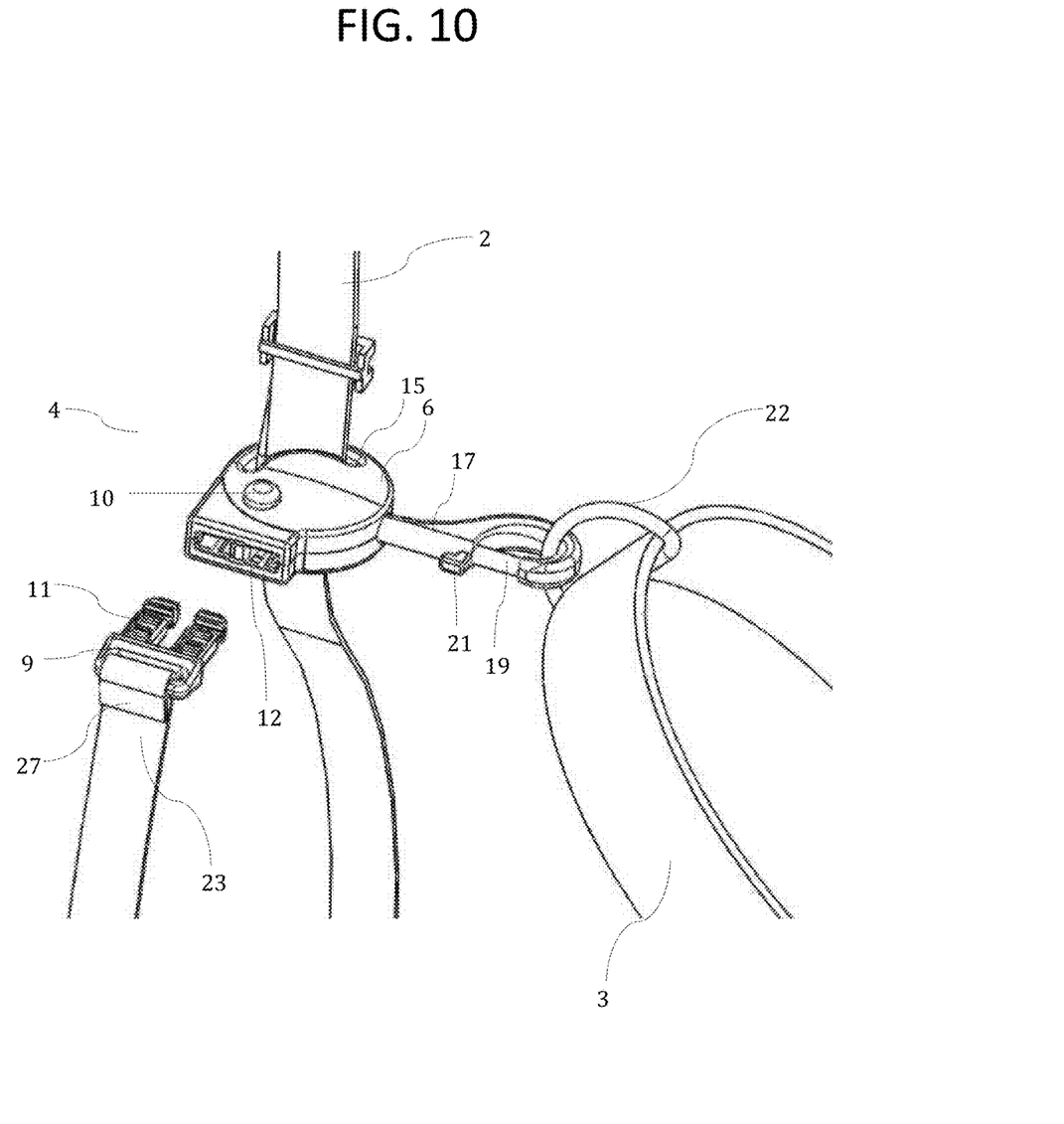
FIG. 10 is an enlarged top perspective view of the apparatus attached to a pet leash and a pet collar in the open position.
Figure 11:
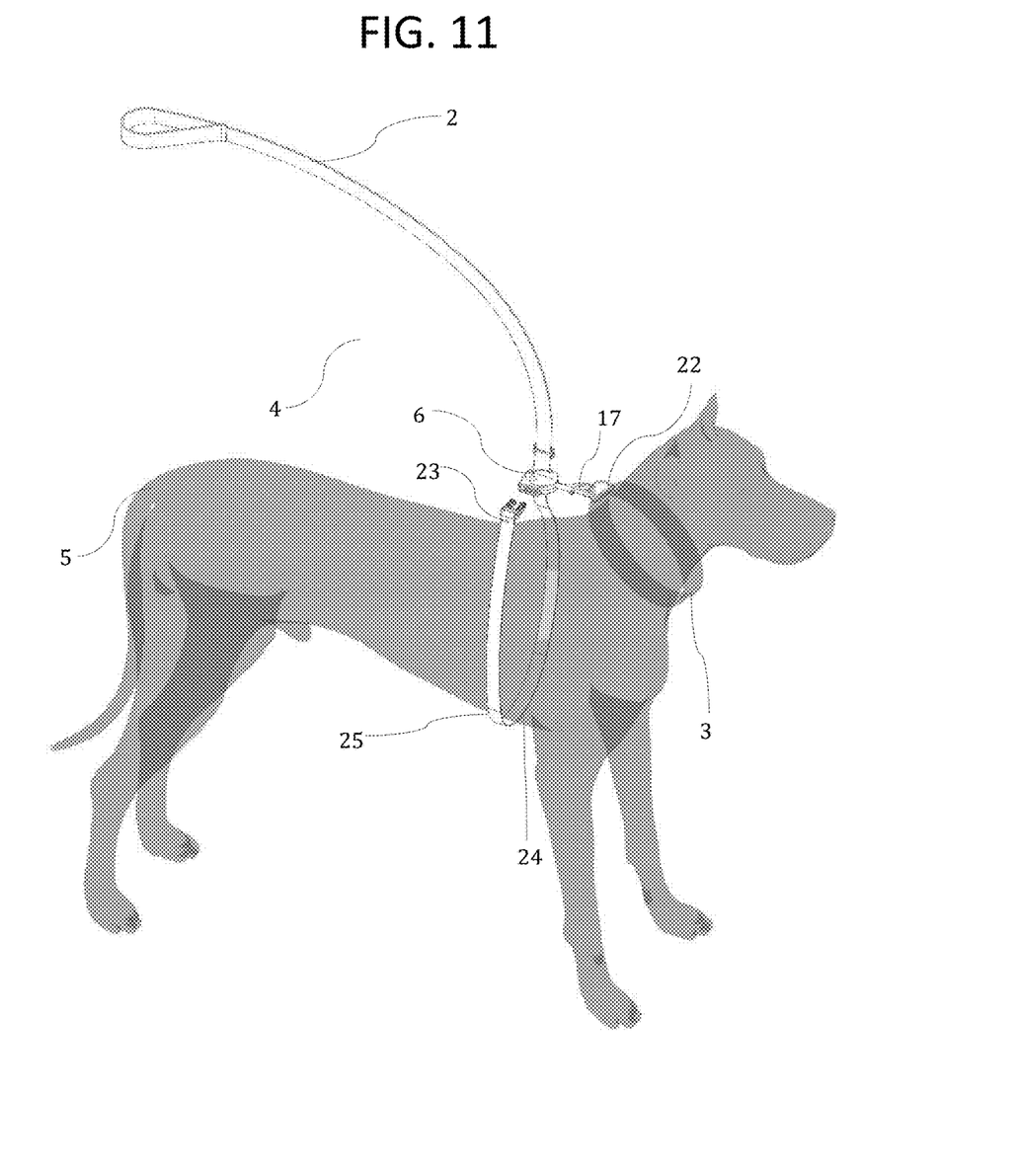
FIG. 11 is a top perspective view of the apparatus attached to a pet leash and a pet collar around an animal, in the open position.
Figure 12:
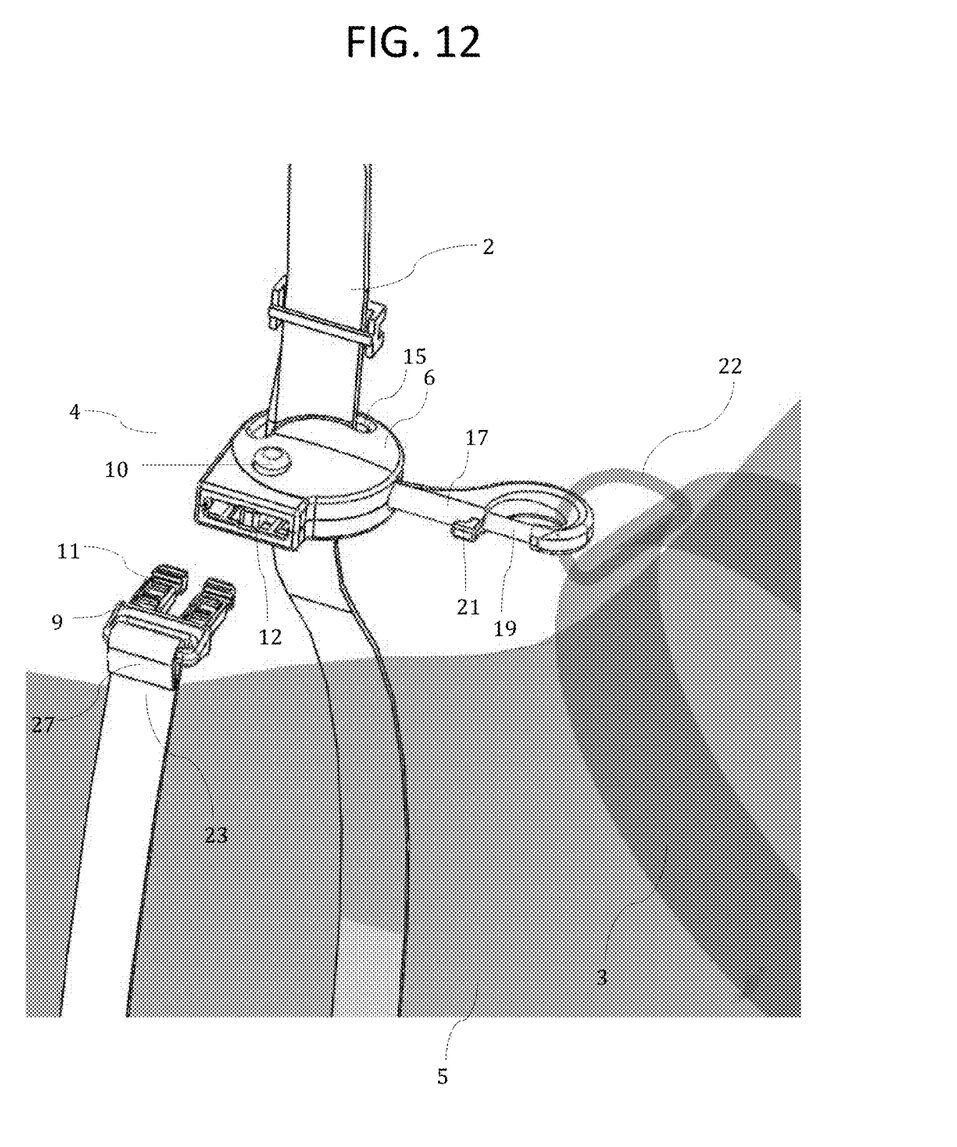
FIG. 12 is an enlarged top perspective view of the apparatus attached to a pet leash and a pet collar around an animal, in the open position.

FIGS. 1-12 illustrate an embodiment of an apparatus 1 for removably coupling an animal leash 2 and an animal collar 3 to form a removable restraining assembly 4 on an animal 5 (as illustrated in FIGS. 11 and 12).

The apparatus 1 comprises a cylindrical housing 6 with a central axis, two sides 7 and 8. In embodiments of the subject invention, the sides 7 and 8 may be flat, concave or convex. In further embodiments of the subject invention, the housing 6 may be any one of the following shapes, including but not limited to: cylinder, sphere, cube, cuboid, hexagon or octagon.

The housing 6 is connected to a removable clip 9. The housing 6 contains a user-actuated release button 10 for separating housing 6 from clip 9 into the unlocked position as shown in FIGS. 7-12. In one embodiment, clip 9 contains two prongs 11 configured to interlock into two latch openings 12 in housing 6. The button 10 contains two catches 13 that latch onto the two prongs 11 of the clip 9. A compressible spring 14 holds the catches 13 on the two prongs 11 in the closed configuration. Once the button 10 is pressed, the spring 14 is compressed, releasing the two catches 13 from the two prongs 11, allowing the clip 9 to be removed from the latch opening 12.

The housing 6 contains a channel 15 that traverses the housing 6 with openings 16 on both sides 7 and 8. The channel 15 is elongated and narrow to slidably receive a wide flat leash 2. This channel 15 configuration prevents the contained leash 2 from turning or becoming tangled in the apparatus 1. This channel 15 configuration also retains a contained leash 2 in substantial alignment with the central axis of the housing 6.

The clip 9 contains a channel 26 that traverses the clip 9. The channel 26 is elongated and narrow to slidably receive a wide flat leash 2. This channel 26 configuration prevents the contained leash 2 from turning or becoming tangled in the apparatus 1.

The housing 6 further contains an integrated connector, which may be a bolt snap 17. The bolt snap 17 is attached to the housing 6 along the central axis and extends away from the housing 6 to a distal end retaining body 18. The bolt snap 17 is shaped like a question mark and contains a movable bolt 19 attached to an internal compressible spring (not shown) that impels the movable bolt 19 towards the curved end area 20 of the retaining body 18 in the closed position. An actuating member 21 that is attached to the movable bolt 19. The actuating member 21 is manually moved such that the bolt 19 no longer contacts the curved end area 20 of the retaining body 18 in the open position.

As illustrated in FIG. 11, the apparatus 1 is placed on the back of an animal 5, such that the end 18 of bolt snap 17 is near a neck-mounted collar 3. The bolt snap 17 is moved into the open position with the actuating member 21 and attached to a ring 22 on the collar 3. The bolt snap 17 is then allowed to close by releasing the actuating member 21. The non-handle end 23 of a wide, flat leash 2 is inserted through the channels 15 on the housing 6. The leash 2 is the wrapped onto the abdomen 24 of the animal 5 and encircled around the torso behind the forelegs. The non-handle end 23 of the leash 2 is then looped through the other channel 26 on the housing 6 to form a complete loop 25 around the animal 5. In embodiments of the subject invention, the non-handle end 23 of the leash 2 may a loop 27 enclosed within channel 26 of the clip 9. The elongate and narrow shape of the channels 15 and 26 prevents the contained leash 2 from turning or becoming tangled in the apparatus 1 or around the animal 5.

The apparatus 1 may be easily removed by pressing the user-actuated release button 10 to separate the clip 9 from the housing 6. Once the button 10 is pressed, the spring 14 is compressed, releasing the two catches 13 from the two prongs 11, allowing the clip 9 to be removed from the latch opening 12.

Once the clip 9 and the housing 6 are separated, the circular loop 25 formed by the leash 2 is broken. Once the bolt snap 17 is also released from the collar 3, the leash 2 and the apparatus 1 may be removed from the animal 5. The leash 2 may remain attached to the apparatus 1, through the channels 15 and 26, to allow a user to easily re-attach the looped leash 25 to the animal 5.

In embodiments of the subject invention, the leash 2 is preferably a not a cord or chain leash, but a flat strap leash composed of non-metallic materials, such as nylon or leather.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An animal restraining apparatus comprising:
   a housing comprising a central axis defined by a first side and a second side, wherein the housing further comprises a first elongated, substantially flat channel traversing the housing, further wherein the housing comprises a latch opening;
   a clip removable received within the latch opening of the housing, wherein the clip comprises a second elongated, substantially flat channel traversing the clip;
   a user-actuated mechanism on the housing that locks the clip within the latch opening of the housing, wherein actuation of the mechanism unlocks the clip from the housing;
   a bolt snap extending along a first axis from a proximal end attached to the housing to a distal end, wherein the first axis is substantially perpendicular to the central axis of the housing;
   an elongated, substantially flat leash, with a proximal handle end, and a distal end, wherein the distal end of the leash is looped through the second channel of the clip and is attached to itself, further wherein between the proximal end and the distal end, the leash traverses the first channel of the housing in a substantially flat orientation;
   wherein the apparatus is configured to mount on a back of an animal such that the distal end of the bolt snap is proximate to a neck of the animal,
   wherein the apparatus is configured to hold the animal leash wrapped onto an abdomen of the animal with the proximal end free and the distal end looped through the second channel of the clip such that the leash defines a loop encircling a torso of the animal, wherein the distal end of the bolt snap is removably attached to an animal collar of the animal; and
   wherein the apparatus is removed from the animal by actuating the user-actuated mechanism on the housing to unlock the clip, thereby breaking the loop encircling the torso of the animal.

2. The animal restraining apparatus of claim 1, wherein the housing is substantially cylindrical in shape.

3. The animal restraining apparatus of claim 1, wherein the leash is a wide flat leash.

4. The animal restraining apparatus of claim 1, wherein the leash is a composed of non-metallic materials.

5. The animal restraining apparatus of claim 1, wherein the user actuated release mechanism comprises a spring-action latch release button.

6. The animal restraining apparatus of claim 1, wherein the first channel and the second channel are each configured to hold the leash such that the leash cannot turn in the apparatus.

7. The animal restraining apparatus of claim 1, wherein the first channel and the second channel are each configured to slidably receive the animal leash such that a wide flat surface of the animal leash remains substantially aligned with the central axis as it is inserted.

8. The animal restraining apparatus of claim 1, wherein the first side and the second side of the housing are substantially flat.

9. The animal restraining apparatus of claim 1, wherein the first side and the second side of the housing are substantially coplanar.

10. The animal restraining apparatus of claim 1, wherein the first side and the second side of the housing are substantially perpendicular to the central axis.

11. An animal restraining apparatus comprising:
    a housing comprising a central axis defined by a first side and a second side, wherein the housing further comprises a first elongated, substantially flat channel traversing the housing, further wherein the housing comprises a latch opening;
    a clip removable received within the latch opening of the housing, wherein the clip comprises a second elongated, substantially flat channel traversing the clip;
    a user-actuated mechanism on the housing that locks the clip within the latch opening of the housing, wherein actuation of the mechanism unlocks the clip from the housing;
    a bolt snap extending along a first axis from a proximal end attached to the housing to a distal end, wherein the first axis is substantially perpendicular to the central axis of the housing;
    an elongated, substantially flat leash, with a proximal handle end, and a distal end, wherein the distal end of the leash is looped through the second channel of the clip and is attached to itself, further wherein between the proximal end and the distal end, the leash traverses the first channel of the housing in a substantially flat orientation;
    wherein, when the clip is locked within the latched opening of the housing, the apparatus holds the leash in a loop between the portion of the leash that traverses the first channel of the housing and the distal end of the leash looped through the second channel of the clip, such that the first axis of the bolt snap is substantially perpendicular to the loop of the leash, and the proximal end of the leash is free; and
    further wherein actuating the user-actuated mechanism on the housing unlocks the clip and breaks the leash loop.

12. The animal restraining apparatus of claim 11, wherein the housing is substantially cylindrical in shape.

13. The animal restraining apparatus of claim 11, wherein the leash is a wide flat leash.

14. The animal restraining apparatus of claim 11, wherein the leash is a composed of non-metallic materials.

15. The animal restraining apparatus of claim 11, wherein the user actuated release mechanism comprises a spring-action latch release button.

16. The animal restraining apparatus of claim 11, wherein the first channel and the second channel are each configured to hold the leash such that the leash cannot turn in the apparatus.

17. The animal restraining apparatus of claim 11, wherein the first channel and the second channel are each configured to slidably receive the animal leash such that a wide flat surface of the animal leash remains substantially aligned with the central axis as it is inserted.

18. The animal restraining apparatus of claim 11, wherein the first side and the second side of the housing are substantially flat.

19. The animal restraining apparatus of claim 11, wherein the first side and the second side of the housing are substantially coplanar.

20. The animal restraining apparatus of claim 11, wherein the first side and the second side of the housing are substantially perpendicular to the central axis.

* * * * *